(12) United States Patent
Mefford et al.

(10) Patent No.: US 9,134,170 B2
(45) Date of Patent: Sep. 15, 2015

(54) OPTICAL DETECTION OF RADIOMETRIC EVENTS

(75) Inventors: David Keith Mefford, Brownsboro, AL (US); Robert Alan Smith, Hampton Cove, AL (US)

(73) Assignee: The Boeing Company, Chicago, IL (US)

(*) Notice: Subject to any disclaimer, the term of this patent is extended or adjusted under 35 U.S.C. 154(b) by 908 days.

(21) Appl. No.: 13/185,530

(22) Filed: Jul. 19, 2011

(65) Prior Publication Data

US 2013/0021468 A1 Jan. 24, 2013

(51) Int. Cl.
| | |
|---|---|
| *G06K 9/00* | (2006.01) |
| *H04N 7/18* | (2006.01) |
| *G01J 1/04* | (2006.01) |
| *G01J 1/42* | (2006.01) |
| *G01J 1/02* | (2006.01) |
| *G02B 19/00* | (2006.01) |
| *G02B 6/06* | (2006.01) |
| *G01J 1/06* | (2006.01) |
| *G02B 6/36* | (2006.01) |

(52) U.S. Cl.
CPC ............ *G01J 1/0425* (2013.01); *G01J 1/0266* (2013.01); *G01J 1/4228* (2013.01); *G02B 19/008* (2013.01); *G01J 2001/062* (2013.01); *G02B 6/06* (2013.01); *G02B 6/368* (2013.01)

(58) Field of Classification Search
CPC ..... G01J 1/0425; G01J 1/0266; G01J 1/4228; G01J 2001/062; G02B 19/008; G02B 6/06; G02B 6/368; G02B 27/10; H04N 3/15; H04N 7/18

USPC ............ 348/135; 358/213; 359/619; 434/19; 382/103; 799/22

See application file for complete search history.

(56) References Cited

U.S. PATENT DOCUMENTS

| | | | |
|---|---|---|---|
| 4,221,966 A | 9/1980 | Kerr et al. | |
| 4,323,925 A * | 4/1982 | Abell et al. | 348/340 |
| 5,282,013 A | 1/1994 | Gregoris | |
| 7,286,295 B1 * | 10/2007 | Sweatt et al. | 359/619 |
| 7,671,789 B1 * | 3/2010 | Yu | 342/152 |
| 2003/0107815 A1 * | 6/2003 | Redmond | 359/619 |
| 2005/0276448 A1 * | 12/2005 | Pryor | 382/103 |
| 2009/0163283 A1 * | 6/2009 | Childress | 463/47 |
| 2012/0021385 A1 * | 1/2012 | Belenkii et al. | 434/19 |
| 2012/0026592 A1 * | 2/2012 | Reininger | 359/619 |

OTHER PUBLICATIONS

Baltsavias et al., "Radiometric and Geometric Evaluation of Ikonos Geo Images and Their Use for 3D Building Modelling" Joint ISPRS Workshop High Resolution Mapping from Space 2001, Hannover, Germany, Sep. 19-21, 2001.

* cited by examiner

*Primary Examiner* — Y Lee
*Assistant Examiner* — Salame Amr
(74) *Attorney, Agent, or Firm* — Hugh P. Gortler

(57) ABSTRACT

A coherent fiber array is used to optically detect a radiometric event. The coherent fiber array has a dome-shaped detection surface and a planar output surface. Optical energy from the radiometric event is detected at the dome-shaped detection surface and transferred to the output surface. The coherent fiber array retains directionality of the radiometric event while transferring the optical energy from the dome-shaped detection surface to the planar output surface.

20 Claims, 5 Drawing Sheets

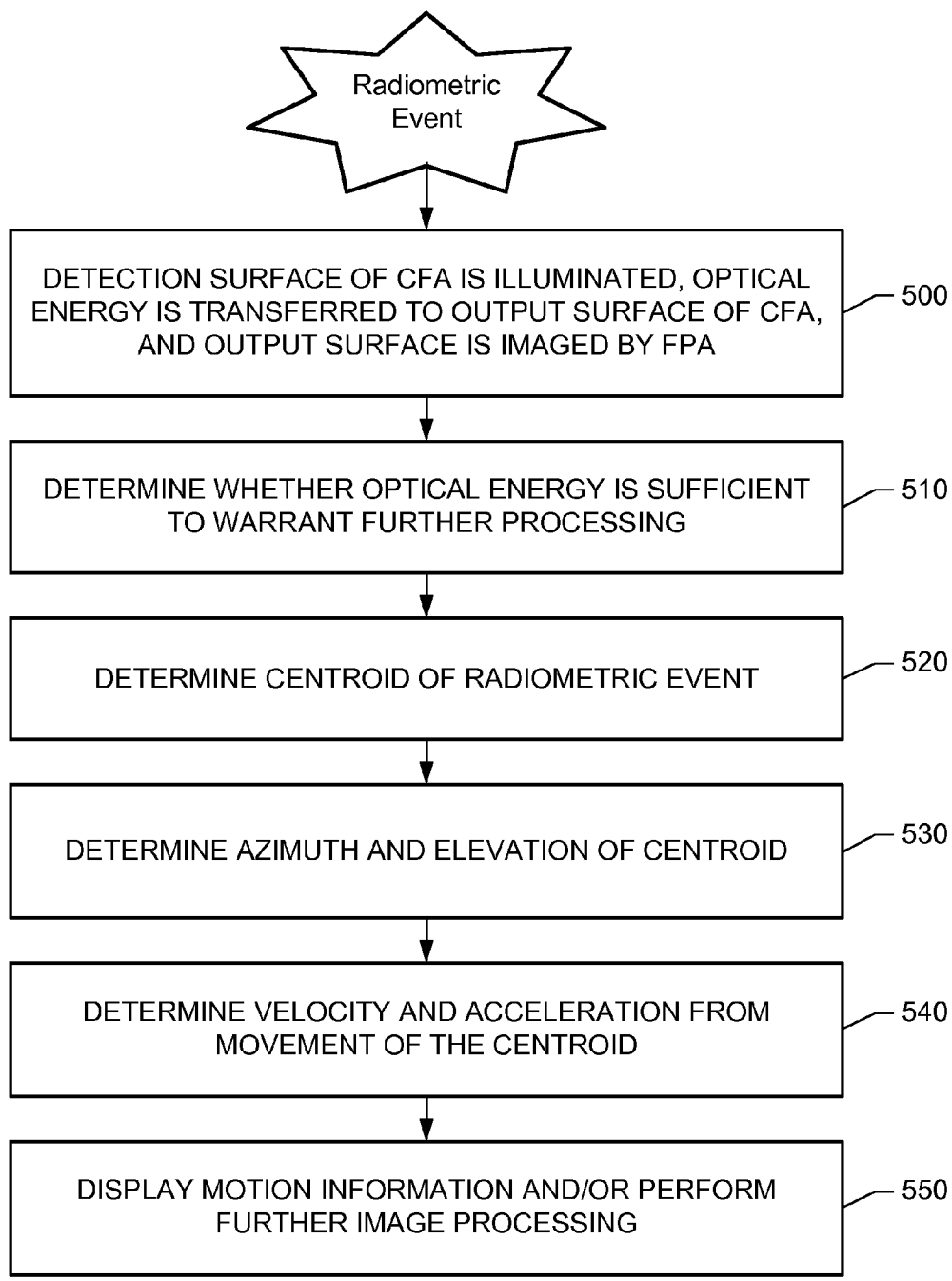

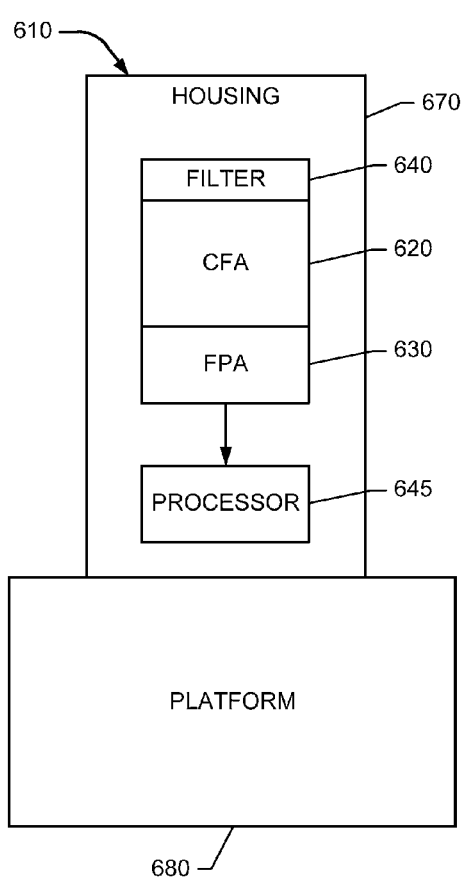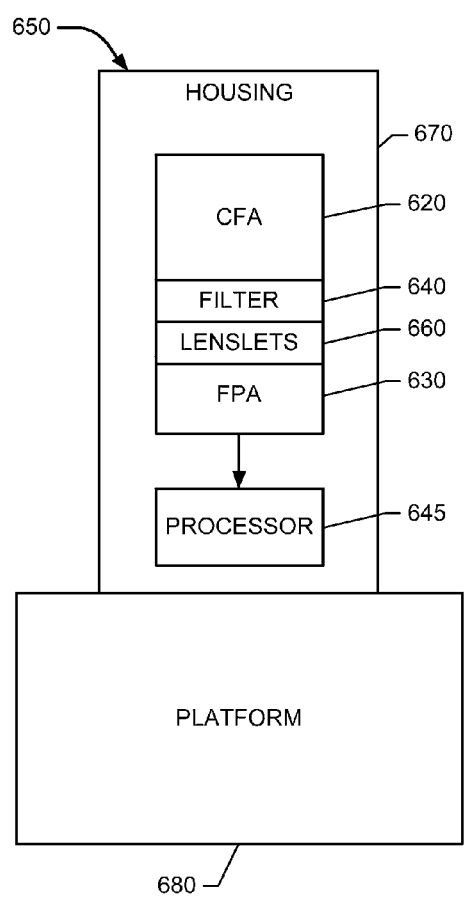

OPTICAL DETECTION OF RADIOMETRIC EVENTS

BACKGROUND

Optical sensor packages that can detect and track radiometric events such as gun fire, rocket-propelled grenades (RPG) and sun glint from man-made polished surfaces are widely used by the military. Optical sensor packages with such capability also have civilian uses.

Current sensor packages use flat focal plane arrays to track radiometric events. The focal plane arrays describe radiometric events in terms of rectilinear coordinates. However, radiometric events are best described in terms of spherical coordinates. Current sensor packages do not efficiently capture radiometric events in terms of spherical coordinates.

Current sensor packages also use scanning devices to obtain a wide field of view and wide elevation angle. These sensor packages are big and bulky due to aperture size and the need for a pan-tilt unit to move the sensor to search the region of interest.

SUMMARY

According to an embodiment herein, a method comprises using a coherent fiber array to optically detect a radiometric event. The coherent fiber array has a dome-shaped detection surface and a planar output surface. Optical energy from the radiometric event is detected at the dome-shaped detection surface and transferred to the output surface. The coherent fiber array retains directionality of the radiometric event while transferring the optical energy from the dome-shaped detection surface to the planar output surface.

According to another embodiment herein, an optical detection system comprises a coherent fiber array (CFA) having a dome-shaped detection surface and a flat output surface. The CFA includes a plurality of optical fibers for collecting optical energy at the detection surface and transferring the collected optical energy to the output surface. The system further comprises a focal plane array for creating an image of the output surface of the CFA, and a processor for processing the image, including identifying a centroid of a radiometric event.

According to another embodiment herein, a system comprises a platform including one of a helmet, tripod, and a gun mount; and an optical detector mounted to the platform. The optical detector includes a coherent fiber array (CFA) having a dome-shaped detection surface and a flat output surface. The CFA includes a plurality of optical fibers for collecting optical energy at the detection surface and transferring the collected optical energy to the output surface. The detector further includes a focal plane array for creating an image of the output surface of the CFA.

BRIEF DESCRIPTION OF THE DRAWINGS

FIG. 5 is an illustration of a method of tracking a radiometric event.

FIGS. 6a and 6b are illustrations of systems for detecting a radiometric event.

DETAILED DESCRIPTION

Figure 1:
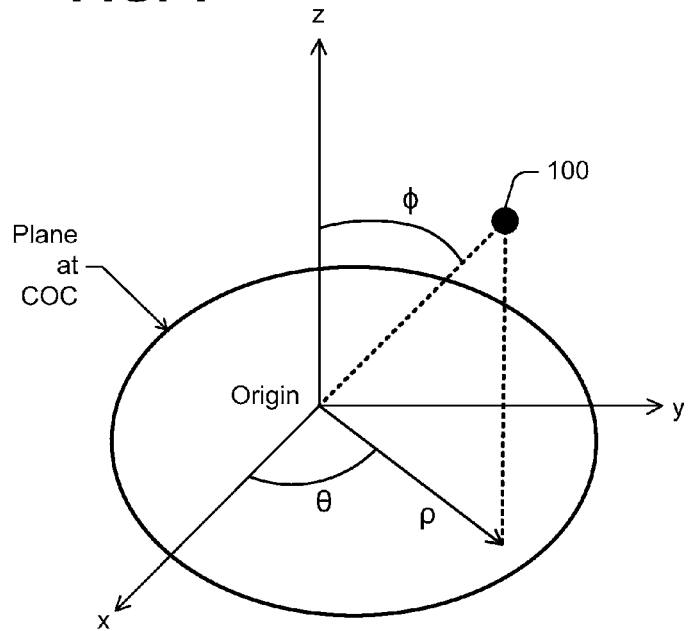
FIG. 1 is an illustration of a radiometric event.

Reference is made to FIG. 1, which illustrates a radiometric event 100. A radiometric event 100 is characterized in terms of optical energy. It is also characterized in terms of radiometry (as opposed to image resolution). As one example, the radiometric event 100 may be a launch of an object such as a projectile. The launch occurs at an origin, where radiant optical energy is generated. After launch, the projectile follows a trajectory towards a target. As the projectile moves towards its target, it continues to generate radiant optical energy. Thus, the radiometric event 100 moves through object space.

Movement of the radiometric event 100 may be described in terms of spherical coordinates: azimuth ($\theta$), elevation ($\phi$) and radius ($\rho$). The radius ($\rho$) is distance from the origin to the projection of the radiometric event 100 on the plane at the center of curvature or "COC" (the COO is the point from which the radius that defines a spherical surface is referenced). The elevation ($\phi$) is the angle measured from a fixed zenith direction (z), and the azimuth ($\theta$) is the angle of the projection on the plane that passes through the origin and is measured from an axis (x) that is orthogonal to the zenith (z).

Figure 2:
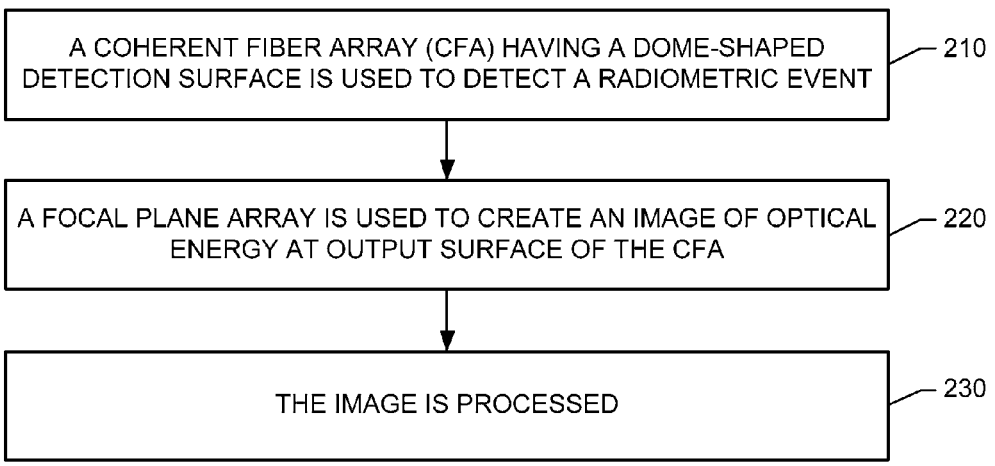
FIG. 2 is an illustration of a method of detecting a radiometric event.

Reference is now made to FIG. 2, which illustrates a method for optically detecting a radiometric event. At block 210, a coherent fiber array (CFA) having a dome-shaped detection surface is used to detect the event (see FIGS. 3 and 4 for illustrations of a CFA). Optical energy detected at the dome-shaped detection surface is transferred to a planar output surface of the CFA.

The applicants have recognized that the CFA retains directionality of the radiometric event while transferring the optical energy in a spherical reference to a planar output surface (unlike a lens, the CFA does not spread out the information). The applicants have also recognized that, because the directionality is retained, features such as point of origin and trajectory of a radiometric event can be identified by a focal plane array (FPA).

At block 220, a focal plane array is used to create an image of the optical energy at the output surface of the CFA. Each pixel of the focal plane array is mapped to at least one fiber of the coherent fiber array (this allows the directionality to be retained). The optical energy captured within the FOV of each fiber is transferred to a pixel of the FPA.

At block 230, the image is processed. The processing may include identifying the origin of the radiometric event. The processing may also include tracking the radiometric event as the radiometric event moves in object space. Tracking data may include not only azimuth and elevation of the radiometric event, but also velocity and acceleration.

The method of FIG. 2 may be used to detect different types of radiometric events. Three examples include, but are not limited to, detection of weapons fire, a rocket-propelled grenade, and sun glint from a man-made polished surface. The method of FIG. 2 may be used to detect the origins of all three examples. The method of FIG. 2 may be used to track the movement of the RPG and the polished surface in object space. A muzzle flash followed by a small projectile will only reveal the muzzle flash. Such a radiometric event will not move through object space. However, an RPG uses a rocket propellant having a radiometric signature that can be tracked through object space. A mortar round might have an IR signature that is detectable. A missile launched from a remote location has a launch, boost, and burn signature that can be detected and tracked.

Figure 3:
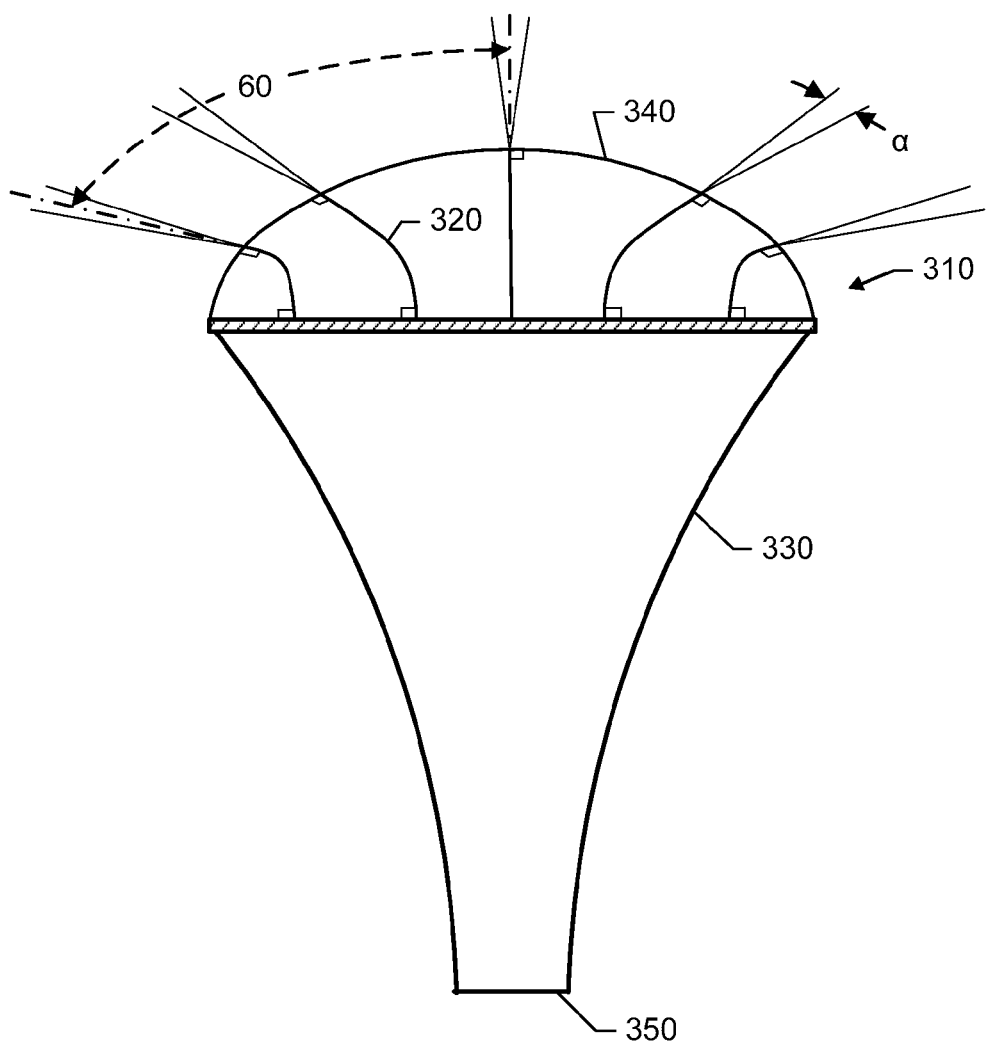
FIG. 3 is an illustration of a coherent fiber array.

Additional reference is made to FIG. 3, which illustrates a CFA 310 including a plurality of optical fiber bundles 320. The CFA 310 has a cylindrical core 330 that is drawn to form a dome-shaped detection surface 340. The core tapers to a flat output surface 350. Flat face tips at one end of the fiber bundles 320 are perpendicular to the detection surface 340.

Flat face tips at the other end of the fiber bundles 320 are perpendicular to the output surface 350. As a consequence the fibers bundles 320 are curved in order to be normal to their respective surfaces 340 and 350.

Each fiber bundle 320 terminating on the detection surface 340 has a finite numerical aperture (NA) which is related to the index difference between core and cladding of the optical fibers in the fiber bundle 320. The numerical aperture of each fiber bundle 320 determines its own staring field of view (FOV). The staring field of view is denoted by the angle α, which is a function of elevation FOV. The fiber bundles 320 collectively provide a wide azimuth FOV (e.g., 360 degree azimuth FOV) and a wide elevation FOV (e.g., a 90 to 120 degree elevation FOV) without the use of any gimbal systems or other scanning devices.

The taper between the dome-shaped detection surface 340 and the output surface 350 is noticeable. The taper length also affects the NA or subtended solid angle of the Instantaneous FOV (IFOV), getting narrower as the taper length increases. On the output surface 350, the numerical aperture is essentially unity. The fiber apertures on the detection surface 340 are preferably larger than the fiber apertures on the output surface 350. By scaling down the fibers from the detection surface to the output surface, many fibers may be correlated to a single FPA element. The degree of scaling is based on a tradeoff between multiple fibers/pixel that increases signal versus angular resolution due to the IFOV of each fiber.

In FIG. 3, only five optical fiber bundles 320 are shown. In practice, however, the CFA 310 may have thousands of optical fiber bundles 320 densely packed usually into a uniform arrangement (e.g., circular). In general, CFAs can take on many different forms and be many tens of meters in length. For a sensor package herein, however, the CFA 310 may only be tens of centimeters in length.

The CFA 310 does not function as a lens and focus energy onto the focal plane array. Rather, the primary function of the CFA 310 is to transfer energy with or without magnification.

Figure 4:
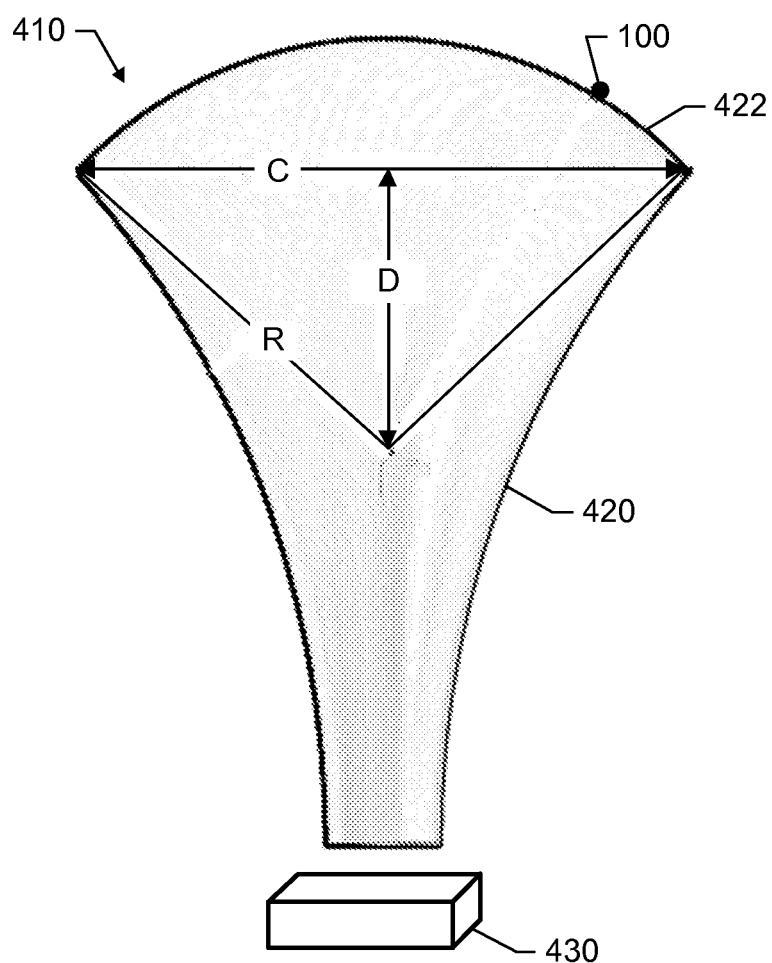
FIG. 4 is an illustration of a system including a coherent fiber array and a focal plane array.

Reference is now made to FIG. 4, which illustrates a system 410 including a CFA 420 and a flat focal plane array 430. For the examples below, the CFA 420 has the following dimensions: a detection surface diameter of C=25.64 mm; a radius of curvature of R=18.13 mm; and an axial distance from center of curvature to base of detection surface 440 of D=12.82 mm.

Each pixel of the focal plane array 430 is mapped to at least one fiber of the CFA 420. In practice, there might be 49 or 50 fibers mapped to a single FPA pixel. Since each FPA pixel is the detection device from which the data is extracted to determine azimuth and elevation, each FPA pixel determines the minimum detection angle. If each fiber has a 1 mrad IFOV, and 49 fibers (7×7) fill an FPA pixel, then the minimum distinguishable angle of the FPA is 7 mrad in either direction.

Reference is once again made to FIG. 1. The CFA 420 detects a radiometric event 100 on the detection surface 422. Each fiber of the CFA 420 transfers optical energy to a pixel of the FPA.

Let x and y denote a reference pixel in x and y directions on the FPA, let Cx and Cy denote a centroid of the radiometric event 100, and let dt denote the frame rate (that is the rate at which images are generated and processed by the FPA). Now define dx=Cx−x; and dy=Cy−y. The azimuth and elevation of the radiometric event may be computed as $$\text{Azimuth}(\Theta) = \tan^{-1}\left(\frac{y}{x}\right); \text{ and}$$

-continued
$$\text{Elevation}(\phi) = \cos^{-1}\left(\frac{d}{\sqrt{x^2 + y^2 + D^2}}\right).$$

Motion of the radiometric event 100 may be computed as $$\text{Velocity in } x \text{ direction} = \frac{dx}{dt};$$
$$\text{Velocity in } y \text{ direction} = \frac{dy}{dt};$$
$$\text{Acceleration in } x \text{ direction} = \frac{dx}{dt^2}; \text{ and}$$
$$\text{Acceleration in } y \text{ direction} = \frac{dy}{dt^2}.$$

Consider the following two examples for a CFA 420 having the dimensions described above. For both examples, assume a 360 degree azimuth FOV and a 90 degree elevation FOV. In both examples, scaling of physical measurement to pixels is performed. The scaling may be performed to determine how many degrees in azimuth and elevation are represented by each pixel. The scaling may be computed as width of FPA/number of columns in FPA.

In the first example, the FPA has a 640×480 array of pixels. Scaling=25.64 mm/480 pixels=0.0534 mm/pixel. A radiometric event is detected by the CFA and transferred to the FPA. The centroid of the event is located on the FPA at Cx=137 and Cy=24. The quantities x and y are determined to be x=137*0.0534=7.29 mm and y=24*0.0534=1.29 mm. Axial distance from center of curvature to base of detection surface is D=12.82 mm (see FIG. 4). From this, $$\text{Azimuth} = \tan^{-1}\left(\frac{1.29}{7.29}\right) = 10.03 \text{ degrees, and}$$

$$\text{Elevation} = \cos^{-1}\left(\frac{12.82}{\sqrt{7.29^2 + 1.29^2 + 12.82^2}}\right) = 30 \text{ degrees.}$$

In the second example, the FPA has a 1300×1300 array of pixels. Scaling=25.64 mm/1300 pixels=0.0197 mm/pixel. A radiometric event is detected by the CFA and transferred to the FPA. The centroid of the radiometric event is located on the FPA at Cx=99 and Cy=57. The quantities dx and dy are determined to be dx=99*0.0197=1.96 mm and dy=57*0.0197=1.13 mm. From this, $$\text{Azimuth} = \tan^{-1}\left(\frac{1.13}{1.96}\right) = 29.96 \text{ degrees, and}$$

$$\text{Elevation} = \cos^{-1}\left(\frac{12.82}{\sqrt{1.96^2 + 1.13^2 + 12.82^2}}\right) = 10.0 \text{ degrees.}$$

A means is used to transfer the optical energy from the output surface of the CFA to the FPA. That means may include, without limitation, an optical lens, an optical relay, a lenslets array, or direct bonding of the CFA to the FPA.

Reference is now made to FIG. 6a, which illustrates an embodiment of an optical detection system 610 including a CFA 620 and an FPA 630. In the embodiment of FIG. 6a, the FPA 630 is bonded to the output surface of the CFA 620. Optical adhesive may be used for direct bonding. Integration of the FPA 630 via direct bond can minimize axial length of the sensor package.

Reference is now made to FIG. 6b, which illustrates an embodiment of an optical detection system 650 including a CFA 620 and an FPA 630, where the FPA 630 is optically coupled to the output surface of the CFA 620 by a lenslets array 660. In some embodiments, the lenslets array 660 includes a small piece of glass that has many small lenses imprinted onto it. The small lenses are aligned horizontally and vertically. Lenslets arrays 660 may be built using MEMS techniques.

Both optical detection systems 610 and 650 include optical band pass filters 640. In the detection system 610 of FIG. 6a, the band pass filter 640 may be formed on the detection surface of the CFA 620. For instance, a filter coating is formed on the detection surface of the CFA 620, and a protective coating (e.g., silicon dioxide) is formed on the filter coating.

In the detection system 650 of FIG. 6b, the band pass filter 640 may be formed on the lenslets array 660, or the detection surface, or both.

The applicants further recognize a synergy provided by the combination of a CFA for conversion of a radiometric event into rectilinear coordinates, and an optical band pass filter of unique radiometric signatures. The combination can be used to accurately locate a potential threat from a radiometric event such as gunfire, a rocket-propelled grenade, or sun glint from a polished surface.

Consider a small caliber muzzle flash. The flash has two key signature detection features. One key feature is potassium D1/D2 doublet lines at 769.89 nm and 766.49 nm. The other key feature is the detection of CO and $H_2O$ bands at 2.8 and 4.5 µm lines from the intermediate flash. The optical band pass filter 640 may be tailored to isolate the potassium lines from the background.

In some embodiments, a second CFA and band pass filter may be used to detect the CO and $H_2O$ bands. Operating in the IR region, the second dual band pass filter is centered at 2.8 and 4.5 µm. The second filter will also reject IR background clutter and focus on energy produced by the muzzle flash from CO and $H_2O$. Operating in the visible region, the first filter, which is in between the Potassium lines, will reject background clutter and provide a strong signal for detection. This combination of visible and IR detection can reduce false alarms and provide the ability to detect the relative azimuth and elevation of the muzzle flash.

Further filtering may be obtained through selection of material for the CFAs. The first CFA may be made of a material that is transmissive to visible light, and the second CFA may be made of a material that is transmissive to infrared.

The system further includes a processor 645 for processing the images generated by the FPA 630. The processing includes detecting and tracking radiometric events, an example of which is illustrated in FIG. 7 and described below. The CFA 620, FPGA 630, processor 645 and band pass filter 640 may be packaged in a housing 670. Resulting is a complete sensor package.

A sensor package herein may be integrated with other systems. For instance, a sensor package herein may be integrated with any camera/data processing system that matches the FPA with a relay lens and has a matched spectral bandpass.

The CFA may be made small and lightweight. As an example, the CFA may have an IFOV of ±10°, a length of 34.5 mm, a detection surface diameter of about 25 mm, an output surface diameter of 5 mm, and a weight of 21 grams.

The use of small, lightweight CFA enables a small, compact sensor package that contains no scanning devices or other moving parts. Yet a sensor package herein can provide detection over 360 degree azimuth FOV. A sensor package herein can also perform tracking over a 90 to 120 degree elevation FOV.

Such small size, light weight and wide field of view enables the sensor package to be used in applications that were previously unattainable. For example, a sensor package herein may be mounted on a platform 680 including one of a helmet, tripod, and gun mount. Other platforms 680 include mobile vehicles, such as an unmanned air vehicle (UAV), helicopter, and High Mobility Multipurpose Wheeled Vehicle (HMMWV or Humvee). Even larger platforms 680 include buildings.

Reference is now made to FIG. 5, which illustrates a method of detecting and tracking a radiometric event. At block 500, the detection surface of the CFA is illuminated by optical energy from the event, and the CFA transfers optical energy from its detection surface to its output surface. Filters only allow energy of interest (e.g., a gunpowder flash) to illuminate the detection surface. The transferred optical energy is detected by the FPA, and an image of the output surface is created.

At block 510, image processing begins. A determination is made as to whether the energy passed by the optical filters is sufficient to warrant further data processing. Insufficient energy might be indicative of a false radiometric event. Insufficient energy might also be indicative of a signature that is not consistent with an expected event. The determination may be made, for instance, by comparing magnitude of the radiometric event to a detection threshold. Or, background subtraction using mean or standard deviation of the data (which helps remove noise) may be used.

At block 520, the centroid of illuminated pixels in the image is found. This is the centroid of the radiometric event. The centroid determines the peak of the signal for a given frame or instant in time.

At block 530, azimuth and elevation of the centroid are determined. The azimuth and elevation may be determined as described above.

As multiple images are processed, velocity and acceleration of the centroid are determined. Azimuth and elevation are also updated. At block 540, velocity and acceleration are determined from movement of the centroid over several frames.

At block 550, the azimuth, elevation, and velocity or acceleration are displayed or sent for post-processing. This information may be displayed to alert an operator of the location of the event, and/or it may be processed further as needed by the platform.

The invention claimed is:

1. An optical detection system comprising
   a coherent fiber array (CFA) having a dome-shaped detection surface and a flat output surface, the CFA including a plurality of optical fibers for collecting unfocused optical energy at the detection surface and transferring the collected optical energy to the output surface;
   a focal plane array (FPA) for creating an image of the output surface of the CFA; and a processor for processing the image, including computing azimuth ($\Theta$) and elevation ($\phi$) of a radiometric event as $$\Theta = \tan^{-1}\left(\frac{y}{x}\right); \text{ and}$$

-continued $$\phi = \cos^{-1}\left(\frac{d}{\sqrt{x^2 + y^2 + D^2}}\right)$$

where x and y denote a pixel in x and y directions on the FPA, and D denotes axial distance from center of curvature to base of detection surface of the CFA.

2. The system of claim 1, wherein each pixel of the focal plane array is mapped to at least one fiber of the coherent fiber array.

3. The system of claim 1, wherein flat face tips of the fibers are perpendicular to the detection surface, each fiber having a finite numerical aperture, the fibers collectively providing a 360 degree azimuth field of view.

4. The system of claim 1, wherein there are no lenslets at the dome-shaped detection surface of the CFA.

5. The system of claim 1, wherein the output surface of the CFA is bonded to the focal plane array.

6. The system of claim 1, wherein the output surface of the CFA is optically coupled to the focal plane array by a lenslets array.

7. The system of claim 1, further comprising a filter on the detection surface.

8. The system of claim 1, further comprising a second CFA, wherein the first and second CFAs are used to detect first and second frequency bands that are unique to a specific radiometric event, and wherein the processor processes images of optical energy within the frequency bands to identify features of the specific radiometric event.

9. The optical detection system of claim 1, wherein the processor also computes:
a centroid of the radiometric, where Cx, Cy denote the centroid; and velocity and acceleration of the radiometric event as a function of dx, dy and dt, where dx =Cx −x, dy =Cy −y, and dt is frame rate of the FPA.

10. The system of claim 6, further comprising a filter deposited on the lenslets array.

11. The system of claim 7, wherein the filter is tailored for the radiometric event, wherein the event is one of gunfire, a rocket-propelled grenade, and sun glint from a polished surface.

12. A system comprising:
a platform including one of a helmet, tripod, and a gun mount;
an optical detector package mounted to the platform, the detector package including a coherent fiber array (CFA) having a dome-shaped detection surface and a flat output surface, the CFA including a plurality of optical fibers for collecting optical energy at the detection surface and transferring the collected optical energy to the output surface; and a focal plane array (FPA) for creating an image of the output surface of the CFA; wherein there are no lenslets at the dome-shaped detection surface of the CFA; and
a processor for computing azimuth ($\Theta$) and elevation ($\phi$) of a radiometric event as $$\Theta = \tan^{-1}\left(\frac{y}{x}\right); \text{ and}$$

$$\phi = \cos^{-1}\left(\frac{d}{\sqrt{x^2 + y^2 + D^2}}\right)$$

where x and y denote a pixel in x and y directions on the FPA, and D denotes axial distance from center of curvature to base of detection surface of the CFA.

13. The system of claim 12, wherein the processor also identifies a centroid of the radiometric event as the radiometric event moves through space.

14. The system of claim 12, further comprising a bandpass filter having a pass band corresponding to a signature of a specific type of radiometric event.

15. The system of claim 12, wherein the filter is on the detection surface.

16. The system of claim 12, wherein the filter is tailored for the radiometric event, wherein the event is one of gunfire, a rocket-propelled grenade, and sun glint from a polished surface.

17. The system of claim 12, wherein the output surface of the CFA is optically coupled to the focal plane array by a lenslets array.

18. The system of claim 17, further comprising a filter deposited on the lenslets array.

19. The system of claim 13, further comprising a second CFA, wherein the first and second CFAs are used to detect first and second frequency bands that are unique to the radiometric event, and wherein the processor processes images of optical energy within the frequency bands to identify features of the radiometric event.

20. The system of claim 13, wherein the processor computes velocity and acceleration of the radiometric event as a function of dx, dy and dt, where Cx and Cy denote the centroid, dx =Cx −x, dy =Cy −y, and dt is frame rate of the FPA.

* * * * *